United States Patent [19]
Wang et al.

[11] Patent Number: 5,519,312
[45] Date of Patent: May 21, 1996

[54] HYBRID SYSTEM OF FUEL CELL AND SUPERCONDUCTING MAGNETIC ENERGY STORAGE DEVICE

[75] Inventors: Xingwu Wang; Aristianto M. Barus, both of Alfred, N.Y.

[73] Assignee: Alfred University, Alfred, N.Y.

[21] Appl. No.: 158,501

[22] Filed: Nov. 29, 1993

[51] Int. Cl.[6] ................................................ H01F 36/00
[52] U.S. Cl. .................................. 323/360; 320/3; 429/23
[58] Field of Search .......................... 429/12, 13, 23; 320/3, 24, 61; 323/360; 363/59, 62, 97, 28, 14, 21

[56] References Cited

U.S. PATENT DOCUMENTS

| | | | |
|---|---|---|---|
| 4,670,702 | 6/1987 | Yamada et al. | 320/21 |
| 4,725,938 | 2/1988 | Onodera | 363/28 |
| 4,839,246 | 6/1989 | Takabayashi | 429/12 |
| 4,839,574 | 6/1989 | Takabayashi | 320/3 |
| 4,887,199 | 12/1989 | Whittle | 363/49 |
| 4,998,526 | 3/1991 | Gokhale | 123/598 |
| 5,023,150 | 6/1991 | Takabayashi | 429/22 |
| 5,181,170 | 1/1993 | Huang et al. | 363/21 |
| 5,334,463 | 8/1994 | Tajima et al. | 429/9 |
| 5,359,308 | 10/1994 | Sun et al. | 335/216 |

*Primary Examiner*—Peter S. Wong
*Assistant Examiner*—Adolf Berhane
*Attorney, Agent, or Firm*—Howard J. Greenwald

[57] ABSTRACT

An apparatus for producing, storing, and delivering direct current electrical energy to a load which contains a fuel cell, a superconducting magnetic energy storage device, a switch electrically connected between the fuel cell and the superconducting magnetic storage device, and a converter for modifying at least one of the electrical characteristics of the direct current electrical energy.

13 Claims, 7 Drawing Sheets

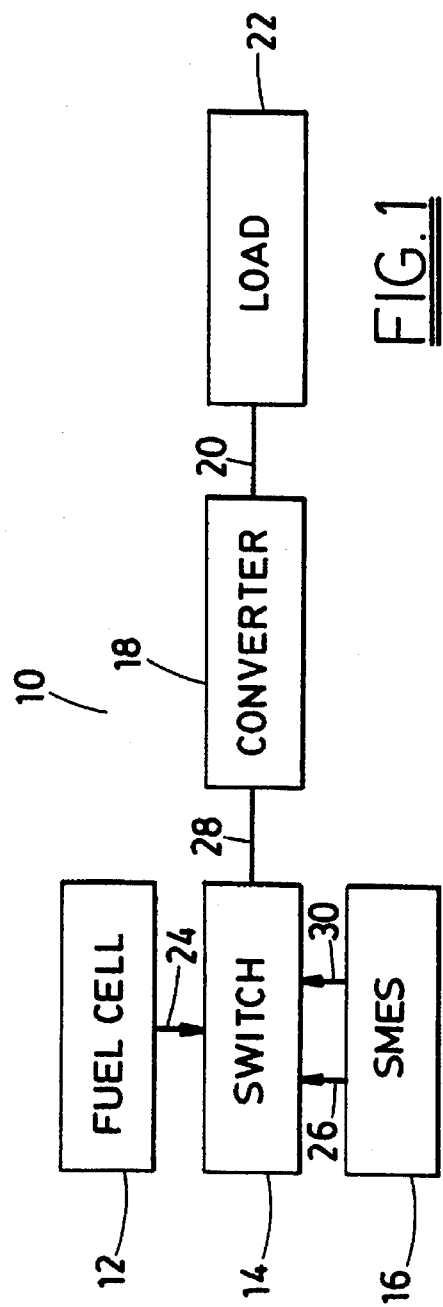
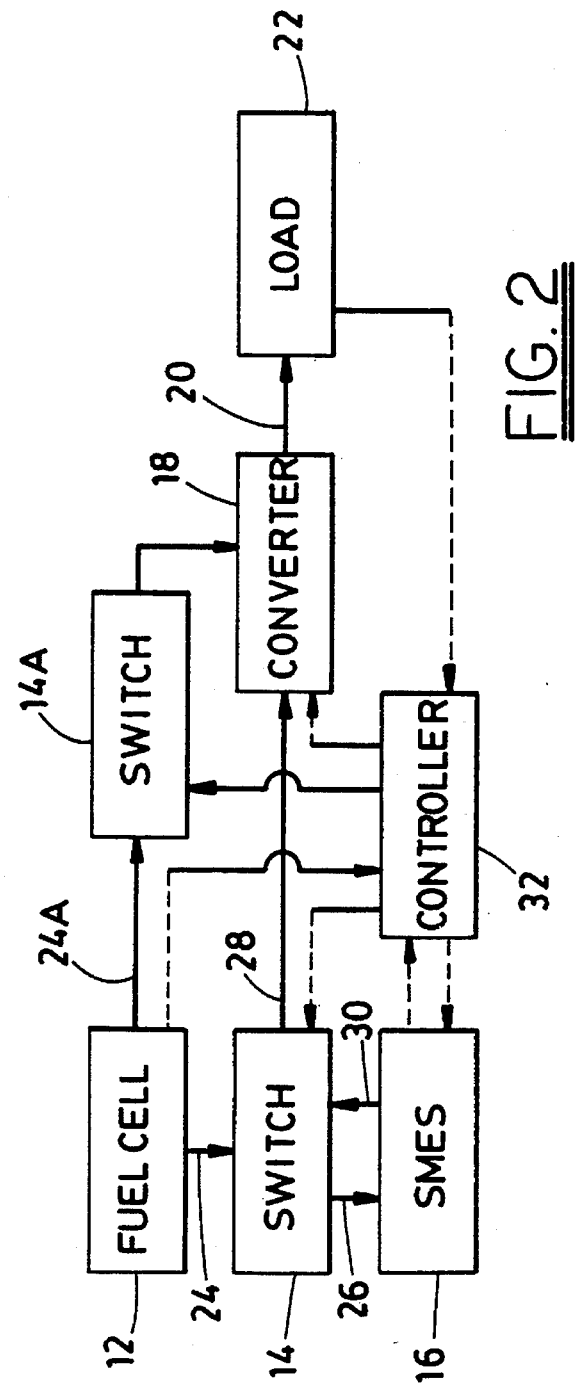

5,519,312

1

HYBRID SYSTEM OF FUEL CELL AND SUPERCONDUCTING MAGNETIC ENERGY STORAGE DEVICE

REFERENCE TO WORK SPONSORED UNDER GOVERNMENT CONTRACT

This invention was made with United States Government support under Contract Number F08635-93-C-0040 awarded by the United States Air Force. The United States Government has certain rights in the invention.

FIELD OF THE INVENTION

A high efficiency system for generating, storing, and delivering electricity which utilizes a fuel cell for generating the electricity, a superconductive magnet energy storage device for storing the electricity, and switching and delivery means.

BACKGROUND OF THE INVENTION

Fuel cells are well known to those skilled in the art; see, for example, U.S. Pat. No. 5,260,105 (the entire disclosure of which is hereby incorporated by reference into this specification) and the publications and patents cited therein.

To the best of applicants' knowledge, no one has described a system for continuously using a fuel cell and storing the output therefrom.

In an article by Yasuhara Ohsawa et al., entitled "Studies on Superconducting Magnetic Energy Storage for Photovoltaic Power Generation" (International Symposium on New Developments in Applied Superconductivity, Suita, Osaka, Japan, Oct. 17–19, 1988, pages 628–633), a system was disclosed for the storage of direct current electrical energy produced by solar cells. This system is rather inefficient for several reasons. In the first place, solar cells only operate during daytime hours when the sun shines and, even during such operation, are only about sixty-percent efficient. In the second place, because the direct current electrical energy is discontinuously delivered to the superconducting magnetic energy storage (SMES) device, the amount of energy required to cool the SMES when it is not receiving electrical energy from the solar cells is not productively used.

It is an object of this invention to provide an electrical energy generation and storage system which produces electrical energy at an efficiency in excess of eighty percent.

It is another object of this invention to provide an electrical energy generation and storage system which continuously delivers electrical energy to either a load and/or an SMES storage device.

SUMMARY OF THE INVENTION

In accordance with this invention, there is provided an electrical energy delivery system comprising a fuel cell, an electrical switch connected to said fuel cell, a superconducting magnetic energy storage device connected to said electrical switch, a converter connected to said electrical switch, and a controller.

BRIEF DESCRIPTION OF THE DRAWINGS

The present invention will be more fully understood by reference to the following detailed description thereof, when read in conjunction with the attached drawings, wherein like reference numerals refer to like elements, and wherein:

2

Figure 3:
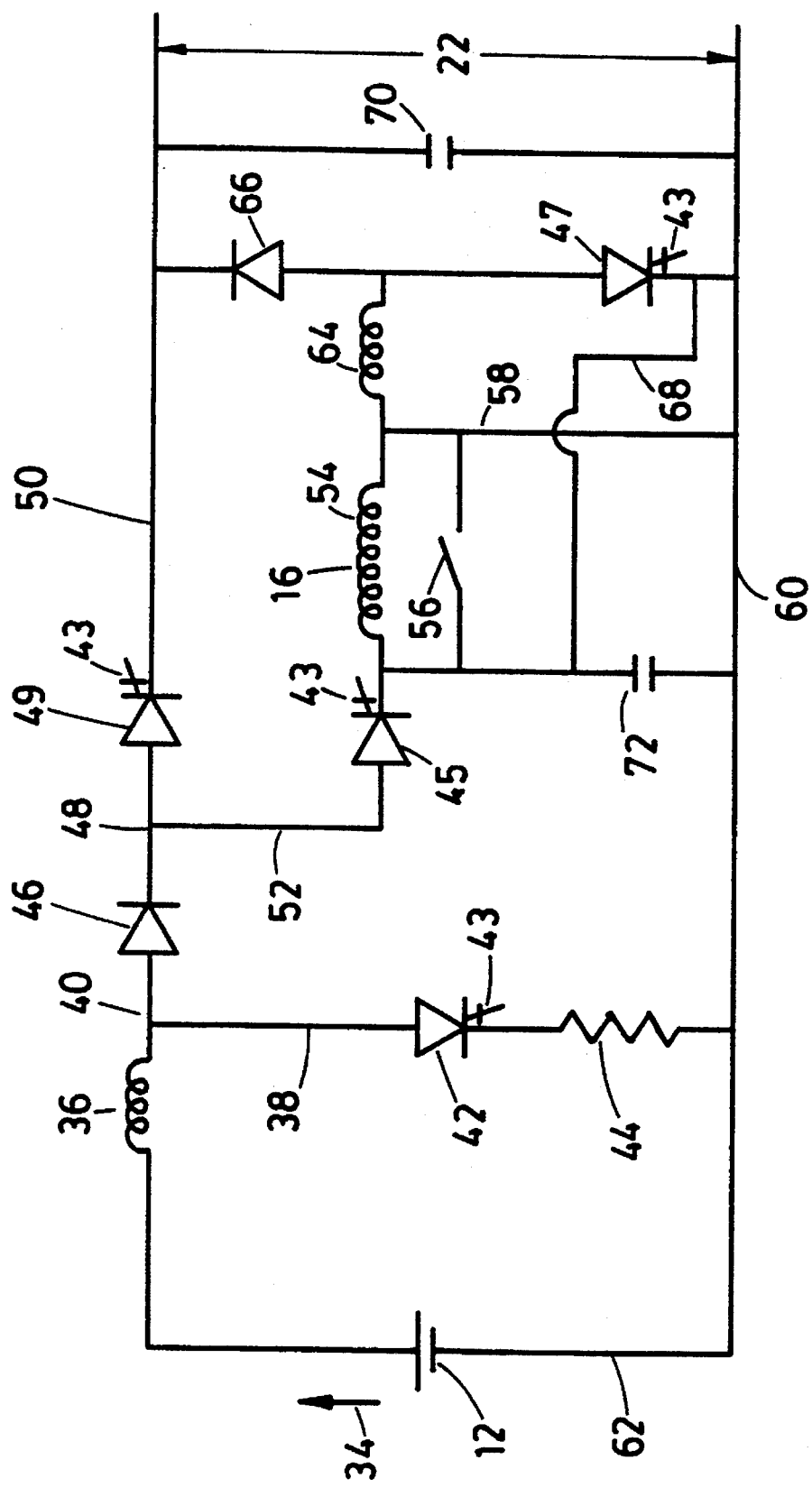
Figure 4:
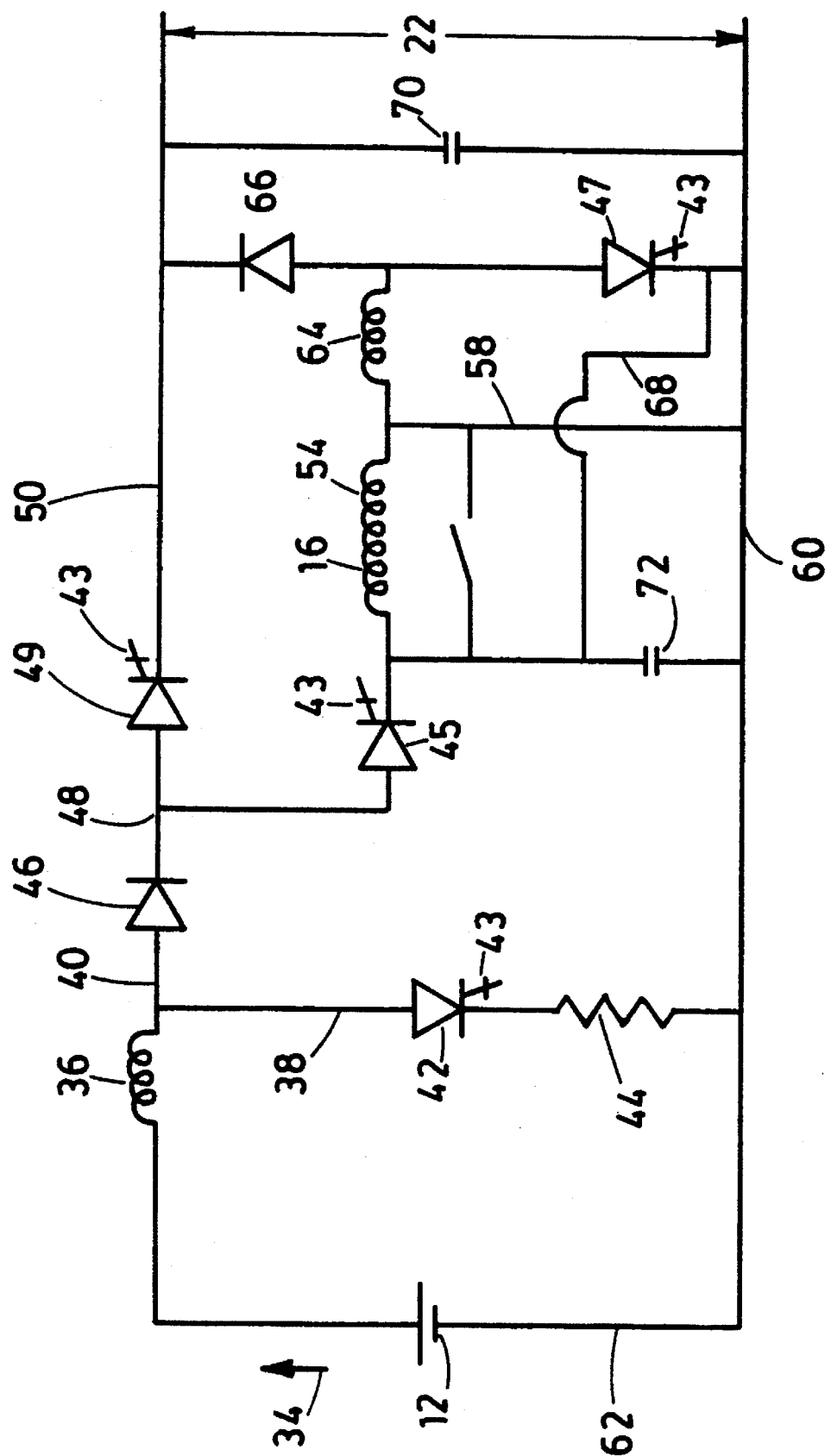
Figure 5:
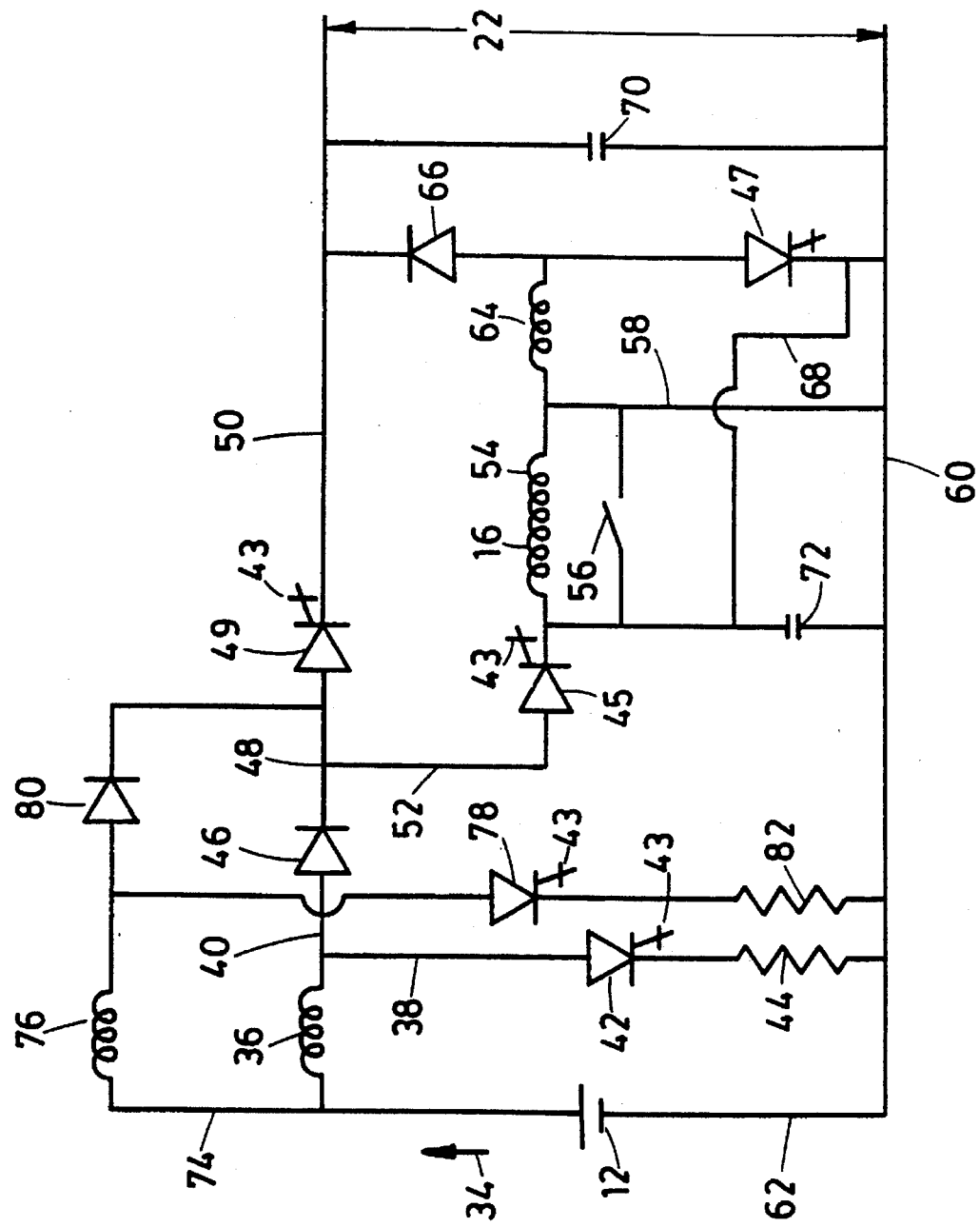
Figure 6:
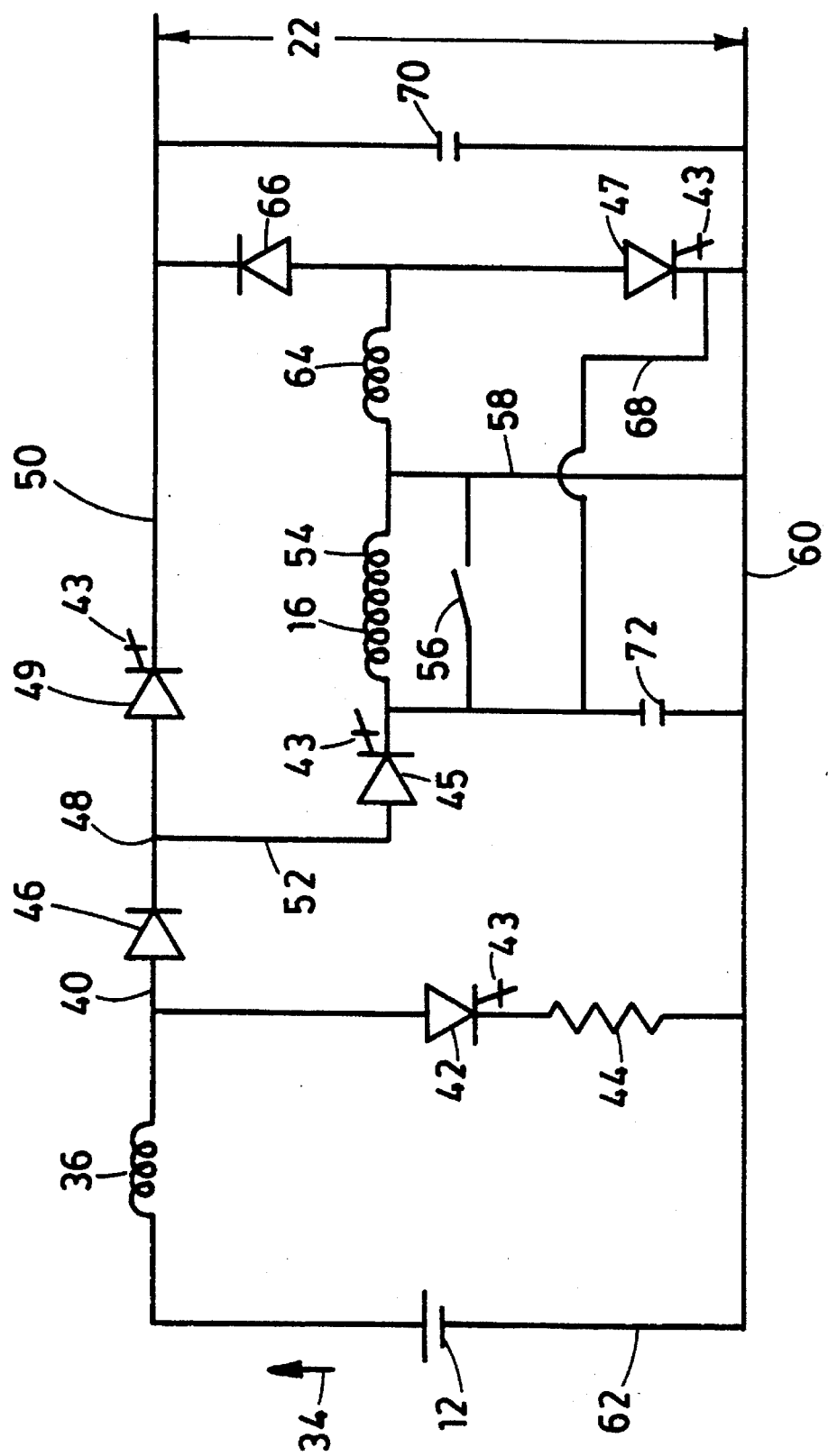
Figure 7:
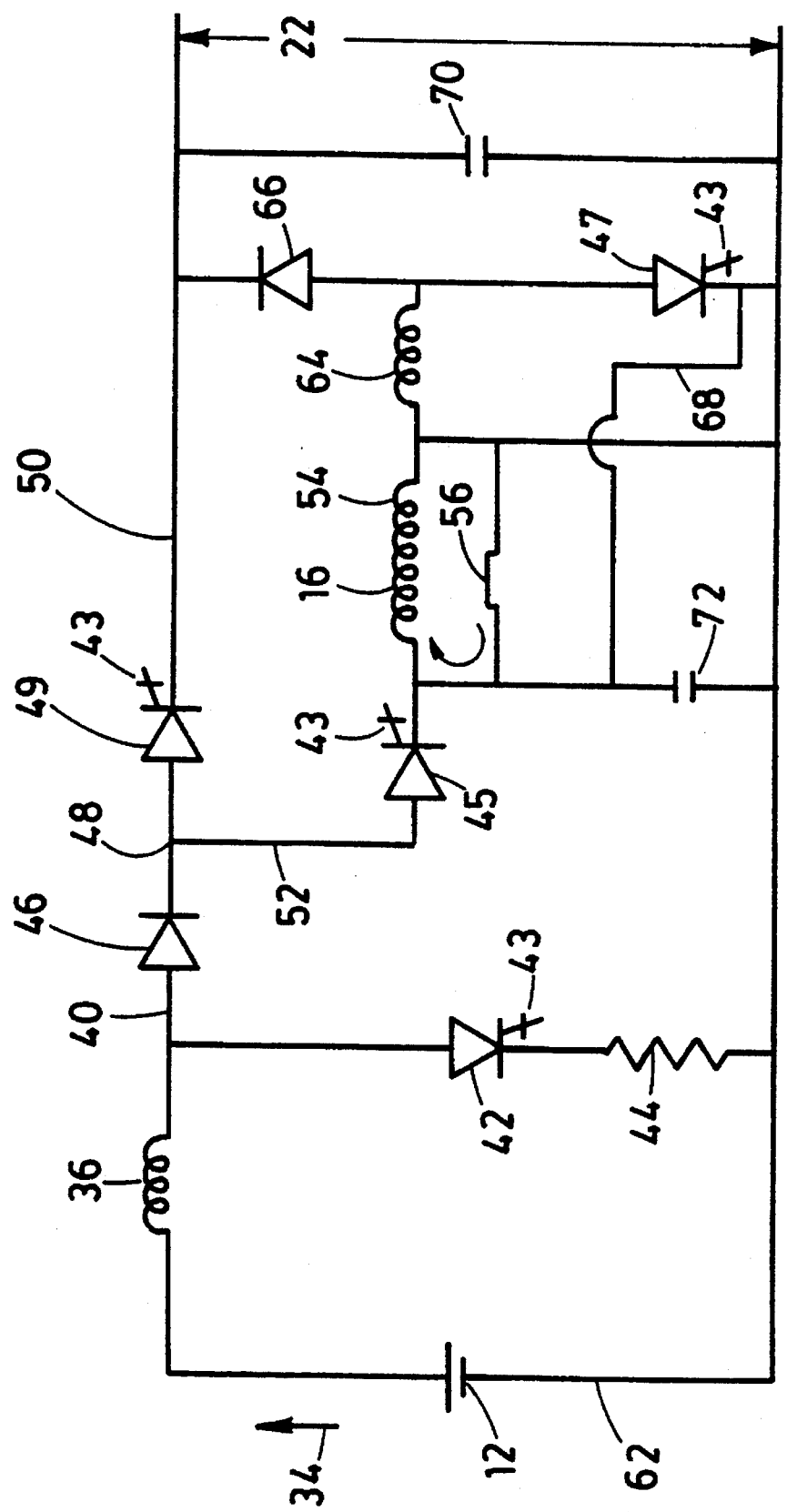
Figure 8:
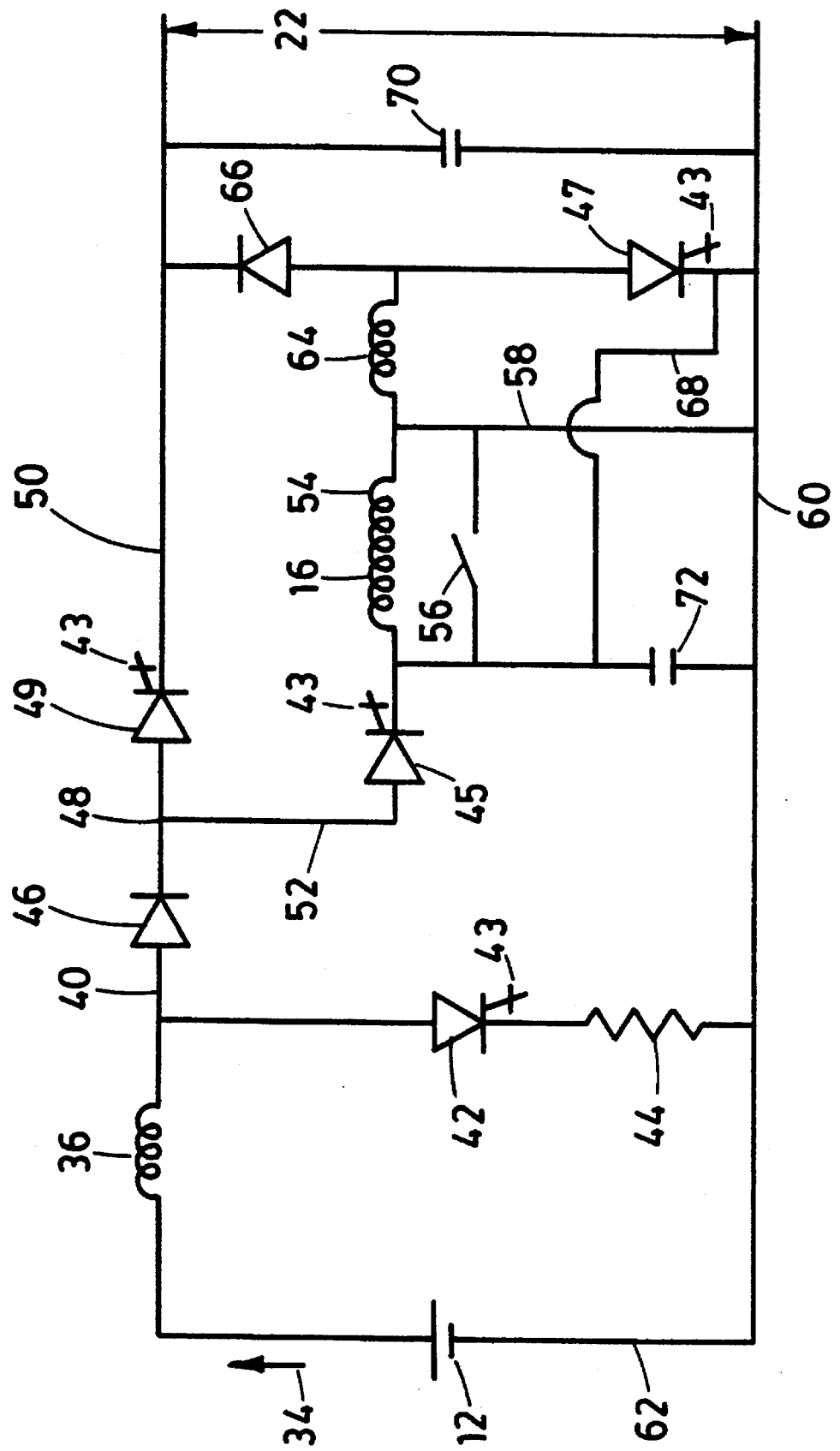

FIG. 1 is a flow diagram illustrating one preferred embodiment of the system of this invention;

FIG. 2 is a flow diagram illustrating another preferred embodiment of the system of the invention;

FIG. 3 is a schematic diagram of one preferred embodiment of a fuel cell/SMES hybrid system;

FIG. 4 is a schematic diagram of the embodiment of FIG. 3 during its energy storage cycle;

FIG. 5 is a schematic diagram of the embodiment of FIG. 3 during the time it is supplying energy to both the SMES and an external load;

FIG. 6 is a schematic diagram of the embodiment of FIG. 3 during the time the SMES is supplying energy to an external load;

FIG. 7 is a schematic diagram of the embodiment of FIG. 3 during the time the fuel cell is supplying energy to an external load; and FIG. 8 is a schematic diagram of the embodiment of FIG. 3 during the time that both the fuel cell and the SMES are supplying energy to an external load.

DESCRIPTION OF THE PREFERRED EMBODIMENTS

FIG. 1 is a flow diagram depicting one preferred embodiment of applicants' electrical energy delivery system 10. Referring to FIG. 1, it will be seen that electrical energy delivery system 10 is comprised of a fuel cell 12, a switch 14, a superconducting magnetic energy storage (SMES) device 16.

A fuel cell is a device which generates electrical energy by converting chemical energy, derived from a fuel supplied to the cell, directly into electrical energy by oxidation of fuel in the cell. These cells are well known to those skilled in the art and are described, e.g., in U.S. Pat. No. 4,988,583 of Watkins et al., U.S. Pat. No. 4,997,726 of Akiyama et al., U.S. Pat. No. 4,981,763 of Mitsuda et al., U.S. Pat. No. 5,026,601 of Iio et al., U.S. Pat. No. 5,021,304 of Ruka et al., U.S. Pat. No. 4,988,582 of Dyer, each of these United States patents is hereby incorporated by reference into this specification.

Fuel cells are electrochemical devices which are comprised of a multiplicity of layers. One preferred class of such electrochemical devices is the solid devices, such as solid fuel cells; see, e.g., a publication entitled "Fuel Cells: A Handbook "(publication DOE/METC-88/6096 [DE88010252], which was published by the United States Department of Energy, Office of Fossil Energy, Morgantown Energy Technology Center, Morgantown, W.V., in 1988). Reference also may be had to A. J. Appleby et al.'s "Fuel Cell Handbook" (Van Nostrand Reinhold, New York, 1989).

Referring to again to FIG. 1, and in one preferred embodiment, fuel cell 12 is a phosphoric acid fuel cell. This type of fuel cell is described on pages 61 to 78 of the aforementioned Appleby et al. "Fuel Cell Handbook."

As is known to those skilled in the art, phosphoric acid fuel cells are well known to those skilled in the art and are commercially available. Thus, in one embodiment, a "PC25" fuel cell which is manufactured by the International Fuel Cell Company of 195 Governors Highway, South Windsor, Conn. is used; this fuel cell continuously delivers 200 kilowatts and 850,000 British Thermal Units per hour of useful heat at full load at temperatures between 100 and 180 degrees Fahrenheit, using natural gas as a fuel.

In another embodiment, a phosphoric acid fuel cell manufactured by the International Fuel Cell Company which produces 11 megawatts of power is used; this fuel cell is described in an article by Kunio Shibata, "The Tokyo Electric Power Company (TEPCO) fuel cell evaluation program," Journal of Power Sources, 37 (1992) 81–99. Many other commercially available fuel cells are described in the Shibata article.

Yet another 11 megawatt phosphoric acid fuel cell is described on page S-3 of the Electric Power Research Institute (EPRI) report EPRI AP-6124 entitled "Availability Assessment of 11-MW Phosphoric Acid Fuel Cell Power Plants," published in 1988.

In yet another embodiment, fuel cell 12 as a molten carbonate fuel cell which is described, e.g., on pages 81–93 of the Appleby et al. publication. In yet another embodiment, the fuel cell used is a solid oxide fuel cell which is described, e.g., on pages 87–102 of the aforementioned Department of Energy Fuel Cell Handbook. Alternatively, or additionally, one may use an alkaline fuel cell (see pages 105–110 of the DOE handbook), a polymer electrolyte fuel cell (see page 111 of the DOE handbook), an acidic electrolyte fuel cell (see page 117 of the DOE handbook), an alkaline electrolyte fuel cell (see page 120 of the DOE handbook), a solid state proton conductor fuel cell (see page 120 of the DOE handbook), and the like.

It is preferred to operate fuel cell 12 continuously. This is contrary to most prior art fuel cell devices in which the fuel cell is operated discontinuously. Thus, e.g., at page 3 of the aforementioned Appleby et al. "Fuel Cell Handbook," it is stated that "The reactants are fed to the electrodes only when electric power generation is required."

Referring again to FIG. 1, the output from fuel cell 12, which is in the form of direct electrical current, is fed via line 24 to switch 14. Depending upon the needs of load 22, switch 14 will supply such direct electrical current either to SMES 16 (via line 26) and/or to converter 18 (via line 28). The switch 28 is preferably under the control of a controller (not shown in FIG. 1, but see FIG. 2) which directs its operation based upon feedback from the load, the SMES, and the fuel cell.

Any switching device which is capable of directing direct current electrical energy from one path to another may be used as switch 14. Thus, referring to P. C. Sen's "Principles of Electric Machines and Power Electronics" (John Wiley & Sons, Inc., New York, 1989), one may use as switch 14 one or more of a thyristor/SCR (see page 508), a triac (see page 513), a GTO (gate-turn-off) thyristor (see page 513), a power transistor/BJT (see page 516), a power MOSFET (see page 519), a diode (see page 521), and the like. Thus, reference to many of the same switching devices may be had to Muhammad H. Rashid's "Power Electronics," Second Edition (Prentice Hall, Inc., Englewood Cliffs, N.J., 1993), to the Motorola Inc. "Thyristor Device Data" handbook (Motorola Inc., Phoenix, Ariz., 1985), and to Delton T. Horn's "The Thyristor Book" (Tab Books, Blue Ridge Summit, Pa., 1990).

In one preferred embodiment, switch 14 is a gate turnoff thyristor manufactured by the Toshiba Corporation; see, e.g., the "Gate Turn-off Thyristor Technical Data Book," published in January, 1989 by the Toshiba Corporation of New York, N.Y.

Referring again to FIG. 1, when load 22 makes no demands upon the system 10, the a controller (not shown in FIG. 1) causes switch 14 to direct the electrical current through line 26 to superconducting magnetic storage device (SMES) 16.

As is known to those skilled in the art, an SMES is an energy storage system which contains a superconducting coil, a means for cooling such coil, and a bypass switch; see, e.g., pages 215–217 of James D. Doss' "Engineer's Guide to High-Temperature Superconductivity," John Wiley & Sons, New York 1989. These SMES devices are well known to those skilled in the art and are described, e.g., in U.S. Pat. No. 4,078,747 of Minovitch, U.S. Pat. No. 4,421,946 of Furuto et al., U.S. Pat. No. 4,528,609 of Purcell, U.S. Pat. No. 4,599,519 of Boenig, U.S. Pat. No. 4,975,113 of Minovitch, U.S. Pat. No. 4,881,446 of Marks et al., U.S. Pat. No. 4,912,443 of Heyne, U.S. Pat. No. 4,982,571 of Marschik et al., U.S. Pat. No. 5,004,361 of Winnie, U.S. Pat. No. 5,006,672 of Prueitt et al., U.S. Pat. No. 5,036,305 of Dederer, U.S. Pat. No. 5,115,219 of Withers, U.S. Pat. No. 5,146,383 of Logan, U.S. Pat. No. 5,160,911 of Herring, and U.S. Pat. No. 5,173,677 of Dederer et al. The disclosure of each of these United States patents is hereby incorporated by reference into this specification.

In one embodiment, the SMES unit used is the model SSD manufactured by Superconductivity, Inc. of P.O. Box 56074, Madison, Wis. This model is available in capacities ranging from 460 to 2,500 kilovolt-amperes; and the operation of this model is described in an article by M. A. Daugherty et al. entitled "SSD Operating Experience," IEEE Transactions on Applied Superconductivity, Volume 3, Number 1 (March, 1993).

In another embodiment a 30 megajoule 10 megawatt SMES is used. Such a unit was in operation in 1984 in the State of Washington at the Tacoma Substation of the Bonneville Power Administration and is described in Los Alamos National Laboratory Report LA-10399-PR entitled "Superconducting Magnetic Energy Storage (SMES) Program" which was published by Los Alamos in May of 1985.

In yet another embodiment, the SMES used is a 20.4 megawatt-hour system described in an article by R. J. Loyd et al., "Key Design Selections for the 20.4 MWh SMES/ETM," (IEEE Transactions on Magnetics, Volume 27, No. 2, 1991); this system was designed by the Bechtel Group, Inc. and the General Dynamics Space Systems Division. A similar SMES, which is described in an article by I. D. Hassan et al. ("400 MW SMES Power Conditioning System," IEEE Power Electronics Specialist Conference, Volume 22, Institute of Electrical and Electronics Engineers [New York], 1991, pages 338–344) also may be used as SMES 16.

Referring again to FIG. 1, electrical power is conveyed by means of switch 14 to SMES 16 when the load 22 does not need the electrical energy which is continuously being produced by fuel cell 12. When, however, load 22 does require some of such energy, then such energy may be conveyed from SMES 16 via line 30 to switch 14 and thence via line 28 to converter 18. It is preferred in converter 18 that some aspect of the electrical energy be changed.

Referring again to FIG. 1, in one embodiment converter 18 is a direct current to direct current (D.C. to D.C.) converter which will change the voltage and current properties of the direct current between load 22 and switch 14. Thus, for example, converter 18 may be a Buck Converter (such as a step-down chopper) which is described on pages 549–551 of the aforementioned P. C. Sen book. Thus, for example, converter 18 may be a Boost Converter (such as a step-up chopper) which is described on pages 552–553 of the P. C. Sen book. Thus, e.g., converter 18 may be a two-quadrant chopper (see page 553 of the P. C. Sen book).

In one embodiment, not shown, switch 14 is comprised of its own converter circuitry; in this embodiment, there is no need for a separate converter 18 and/or the related devices often use to insure proper voltage and current matching.

Referring again to FIG. 1, in another embodiment converter 18 is a direct current to alternating current (D.C. to A.C.) converter. As is known by those skilled in the art, with the development of solid state technology, many means of converting direct current to alternating current have been used in commercial instruments such as, e.g., (1) solid state devices (field effect, bipolar transistors, and the like) that respond as on or off electrical switch in series or in shunt with the direct current unbalance circuit, (2) photoconductive devices which cyclically vary the resistance in the d.c. unbalance circuit with the intensity of light from neon bulbs, (3) a vibrating reed which makes and breaks the d.c. unbalance circuit, and (4) parametric devices, generally reactive in nature, which vary the capacitance or inductance in the d.c. unbalance circuit with the application of current, voltage, magnetic field, and the like. See, e.g., pages 16–72 et seq. of Donald G. Fink et al.'s "Standard Handbook for Electrical Engineers," Eleventh Edition (McGraw Hill Book Company, New York, 1978).

In one embodiment, the converter 18 is an dc/ac bridge converter which is described, e.g., in an article by Roger W. Boom et al. entitled "Superconductive Energy Storage for Power Systems," 1972 Intermag Conference, Kyoto, Japan, Apr. 10–13, 1972, pages 701–703.

In another embodiment, the converter 18 is GTO-CSI model circuit which is described in an article by R. L. Kustom et al., "Research on Power Conditioning Systems for Superconductive Magnetic Energy Storage (SMES)," IEEE Transactions on Magnetics, Volume 27, Number 2, March 1991, pages 2320–2323.

In another embodiment, the converter 18 is the converter module described on page 214 of an article by Byung M. Han et al. entitled "A new power-conditioning system for superconducting magnetic energy storage," IEEE Transactions on Energy Conversion, Volume 8, No. 2, June 1993.

In yet another embodiment, the converter 18 is a solid-state d.c. to a.c. converter described in an article by I. D. Hassan et al., "400 M.W. SMES Power Conditioning System . . . ," IEEE Power Electronics Specialists Conference (New York), Volume 22, 1991, pages 345–353.

In yet another embodiment, converter 18 is a hybrid CSI unit described in an article by R. H. Lasseter et al. entitled "Power Conditioning Systems for Superconductive Magnetic Energy Storage," published in IEEE Transactions on Energy Conversion, Volume 6, Number 3, September, 1991, pages 381–387.

The aforementioned descriptions of converter 18 are merely illustrative, and those skilled in the art will be aware of many other means of converting direct current to alternating current and/or to changing the voltage and current characteristics of direct current. Thus, the means illustrated in FIGS. 3 to 8 also may be used.

FIG. 2 is a flow diagram illustrating another preferred embodiment of applicants' invention.

Referring to FIG. 2, it will be seen controller 32 is operatively and electrically connected to fuel cell 12, first switch 14, second switch 14A, converter 18, load 22, and SMES 16.

The controller 32 is preferably comprised of a computer central processing unit. It senses the demand, if any, of load 22; it senses the amount of power being supplied by fuel cell 12; and it senses the amount of power stored in SMES 16.

Controllers comprising computer central processing units are well known and are described, e.g., in U.S. Pat. Nos. 5,083,479, 5,072,859, 5,065,962, 5,062,059, 5,016,587, 5,011,236, 4,995,772, 4,987,532, 4,920,476, 4,901,218, 4,891,963, and the like. The disclosure of each of these United States patents is hereby incorporated by reference into this specification.

Referring again to FIG. 2, depending upon what is sensed by controller 32, the fuel cell 12 will send direct electrical current either to switch 14 via line 24 and/or to switch 14A via line 24A. As will be apparent to those skilled in the art, each of switches 14 and 14A preferably match the power characteristics of the direct electrical current before passing it to either converter 18 and/or SMES 16.

In one preferred embodiment, each of switches 14 and 14A is a chopper switch.

FIG. 3 is a schematic of one preferred fuel cell/SMES hybrid system 10. Referring to FIG. 3, the fuel cell is indicated as element 12 by the symbol for a battery. Direct current power flows from fuel cell 12 in the direction of arrow 34 through smoothing coil 36 which smooths the output of such power; in one preferred embodiment, coil 36 has an inductance of 1 millihenry.

The smoothed direct current flowing out of coil 36 may be split between branch 38 and branch 40. When switch 42, which may be a gate turn off thyristor, allows current to pass through it, current is returned to fuel cell 12; in this case, branch 38 presents the path of least resistance. Current limiting resistor 44 prevents an excessive amount of current from flowing into fuel cell 12. As will be apparent to those skilled in the art, the controller 32 (not shown in FIG. 3, but see FIG. 2) is connected to the gate 43 of each of the gate turn off thyristors 42, 45, 47, and 49 in the system and independently controls whether each of such switches is on or off.

Alternatively, when switch 42 does not allow current to pass through it, it will flow through power diode 46 and reaches juncture point 48, where it can flow in either branch 50 or branch 52. As before, the gate turn off thyristors 45 and 49 dictate which of branches 50 and 52, if any, the current will flow in.

Referring again to FIG. 3, current passing through branch 50 will flow to load 22. Current passing through branch 52, if it is allowed to pass through switch 45, will flow into SMES device 16, which is depicted in the Figure as being comprised of a coil 54, and a switch 56.

When the controller (not shown) chooses to charge SMES 16, then current is caused to flow through lines 58, 60, and 62 to the fuel cell 12 and then back into the SMES 16. When the controller (not shown) chooses to discharge SMES 16, then current is caused to flow through current-smoothing coil 64 and diode 66 to load 22; thereafter, the current will return via line 68 back to the SMES.

As will be apparent to those skilled in the art, capacitors 70 and 72 tend to smooth the voltages.

In one preferred embodiment, and referring again to FIG. 3, capacitor 70 has a capacitance of 2,000 microfarads, capacitor 72 has a capacitance of 20,000 microfarads, and coil 64 has an inductance of 1 millihenry.

FIG. 4 is a schematic of the embodiment of FIG. 3 when the fuel cell 12 is charging the SMES 16. In this mode, switches 47 and 49 are off, switch 45 is always on, and switch 42 is cycled between on and off. Coil 36, diode 46, switch 42, and capacitor 72 are active and act as boost converter components, as is indicated by the bold face lines of FIG. 4. The relationship between the fuel cell voltage (Vf) and the SMES voltage (Vs) is as follows: $V_s = V_f/(1-k)$, wherein k is the duty cycle. Since the voltage of the SMES varies with time during the charging, the value of k must be adjusted to meet the voltage requirements of the SMES.

FIG. 5 is a modified schematic of the embodiment of FIG. 4 when the fuel cell 12 is charging both the SMES 16 and the load 22. In addition to the circuitry of the embodiment of FIG. 4, the embodiment of this Figure also contains a parallel branch comprised of current smoothing coil 76, gate turn off thryistor 78, power diode 80, and current limiting resistor 82. As will be apparent to those skilled in the art, the embodiment of this Figure contains two parallel branches, one feeding load 22, the other feeding SMES 16. Because the fuel cell 12 supplies energy to both SMES 16 and load 22, switches 45 and 49 are on, switches 42 and 78 cycled between on and off and operate with different duty cycles.

In the embodiment illustrated in FIG. 6, the SMES 16 is discharging to the load 22; referring to FIG. 6, the active components are indicated by heavy, bold-face lines. During this mode of operation, switches 45 and 49 are off, switch 47 cycles between on and off, and coil 64, diode 66, switch 47, and capacitor 70 are active and act as boost converter components. The relationship between the voltage of the SMES (Vs) and the load voltage (Vl) is as follows: Vl=Vs/(1−k), wherein k is the duty cycle of switch 47.

In the embodiment illustrated in FIG. 7, the SMES 16 is preserving energy, and the fuel cell 12 is discharging to the load; in this embodiment, the active components are indicated by the heavy and bold-face lines. During the mode of operation depicted herein, switches 47 and 45 are off, switch 49 is always on, and switch 42 cycles between on and off. Coil 36, diode 46, switch 42, and capacitor 70 are active and act as boost converter components. The relationship between fuel cell voltage (Vf) and load voltage (Vl) is as follows: Vl=Vf/(1−k), wherein k is the duty cycle of switch 42. As will be apparent to those skilled in the art, in this embodiment, SMES switch 56 is closed.

FIG. 8 illustrates an embodiment in which both the fuel cell 12 and the SMES 16 are supplying power to the load 22; the active components of this embodiment are illustrated in the dark, bold-face lines. During the operation of this embodiment, switch 45 is off, switch 49 is always on, and switches 42 and 47 cycle between on and off. Coil 36, diode 46, switch 42, and capacitor 70 act as a boost converter between fuel cell 12 and load 22; and coil 64, diode 66, switch 47, and capacitor 70 act as a boost converter between SMES 16 and load 22. The duty cycle related to the discharging of the fuel cell 12 is the same as that of the embodiment of FIG. 7, and the duty cycle related to the discharging of the SMES 16 is the same as FIG. 6.

In general, when the voltage from the fuel cell 12 is being stepped up, the duty cycle (k) will range from about 0.2 to about 0.8; a similar range of duty cycles is applicable to the operation of SMES 16.

In another embodiment, not shown, a Buck circuit is used to step down the voltage from fuel cell 12 and/or SMES 16.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

Thus, for example, as will be apparent to those skilled in the art, in the embodiment depicted in FIG. 1, a converter 18 may not be required in certain cases if the voltage from switch 14 is compatible with the load 22.

The power delivered by device 10 may range from 1 megawatt—second to 20 megawatts—hour.

We claim:

1. An apparatus for producing, storing, and delivering direct current electrical energy to a load comprised of a fuel cell with a direct current, constant voltage output, a superconducting magnetic energy storage device with a variable voltage, a first switch electrically connected between said fuel cell and said superconducting magnetic storage device, a second switch electrically connected between said fuel cell and a converter, and said converter for modifying at least one of the electrical characteristics of said direct current electrical energy, wherein:

(a) said converter changes the voltage of said direct current electrical energy, (b) said converter is comprised of a capacitive voltage smoothing circuit and an inductive current smoothing circuit, (c) said apparatus is comprised of means for matching said direct current, constant voltage output of said fuel cell and said variable voltage of said superconducting magnetic storage device in accordance with the formula Vs=Vf/(1−k), wherein Vs is the said voltage output of said superconducting magnetic storage device, Vf is said constant voltage output of said fuel cell, and k is a duty cycle.

2. The apparatus recited in claim 1, wherein said converter increases the voltage of said direct current electrical energy.

3. The apparatus as recited in claim 1, wherein said converter decrease the voltage of said direct current electrical energy.

4. The apparatus as recited in claim 1, wherein said converter transfers said direct current electrical energy to alternating current electrical energy.

5. The apparatus as recited in claim 1, wherein said apparatus is comprised of a controller.

6. The apparatus as recited in claim 1, wherein said first switch is a thyristor.

7. The apparatus as recited in claim 6, wherein said thyristor is a gate turn off thyristor.

8. The apparatus as recited in claim 1, wherein said apparatus is comprised of a current-limiting resistor.

9. The apparatus as recited in claim 8, wherein said current limiting resistor is connected between said first switch and said fuel cell.

10. The apparatus as recited in claim 1, wherein said apparatus is comprised of a diode.

11. The apparatus as recited in claim 10, wherein said diode is disposed between said fuel cell and said superconducting magnetic energy storage device.

12. The apparatus as recited in claim 1, wherein said apparatus is comprised of a capacitor.

13. The apparatus as recited in claim 12, wherein said capacitor is connected in parallel with said load.

* * * * *